United States Patent [19]

Mariaux et al.

[11] Patent Number: 5,647,793
[45] Date of Patent: Jul. 15, 1997

[54] APPARATUS AND METHOD FOR PREVENTING SUDDEN CHANGES OF PRESSURE IN VEHICLES

[75] Inventors: Gilles Mariaux, Beynac; Yves Gervais, Poitiers, both of France

[73] Assignee: GEC Alsthom Transport SA, Paris, France

[21] Appl. No.: 687,603

[22] PCT Filed: Dec. 21, 1995

[86] PCT No.: PCT/FR95/01710

§ 371 Date: Aug. 8, 1996

§ 102(e) Date: Aug. 8, 1996

[87] PCT Pub. No.: WO96/19371

PCT Pub. Date: Jun. 27, 1996

[30] Foreign Application Priority Data

Dec. 22, 1994 [FR] France .................... 94 15489

[51] Int. Cl.⁶ .................................. B61D 27/00
[52] U.S. Cl. ................... 454/70; 454/103; 454/105
[58] Field of Search ................... 454/75, 103, 105

[56] References Cited

U.S. PATENT DOCUMENTS 5,391,111  2/1995  Girard et al. ................... 454/105 X
5,439,415  8/1995  Hirikawa et al. .................. 454/105 X
5,462,481  10/1995  Riedel et al. ...................... 454/105 X

FOREIGN PATENT DOCUMENTS 0143931  6/1985  European Pat. Off. .
0315108  5/1989  European Pat. Off. .
0579536  1/1994  European Pat. Off. .
0622287  11/1994  European Pat. Off. .
5-77726  3/1993  Japan ...................... 454/105

Primary Examiner—Harold Joyce
Attorney, Agent, or Firm—Sughrue, Mion, Zinn, Macpeak & Seas

[57] ABSTRACT

An apparatus for preventing sudden changes of pressure in an air conditioned or ventilated vehicle, the vehicle comprising: an inlet orifice (3) for outside air and an outlet orifice (5) for inside air, the inlet orifice being connected to an intake duct (2) directing the air taken in to an air conditioning or ventilation system, the outlet orifice being connected to an exhaust duct (4) exhausting the inside air to the outside; shutter means (6, 7) for the intake and exhaust ducts (2, 4); a control member (14) receiving signals from the detector; and detector means (16, 17) for detecting the pressure outside the vehicle Po and the pressure inside the vehicle Pi and delivering signals representative of the pressure wave.

6 Claims, 2 Drawing Sheets

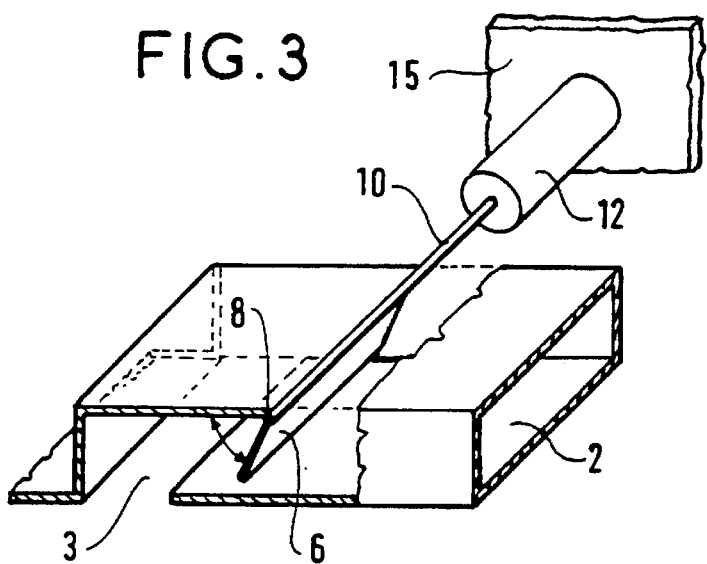
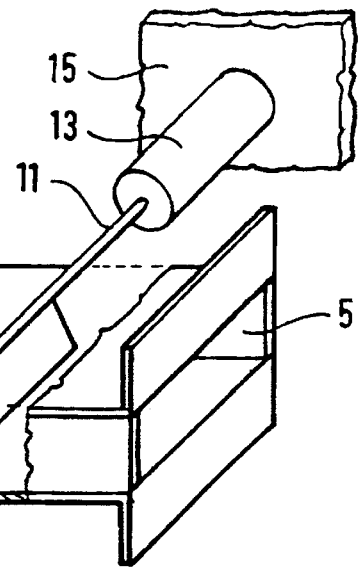
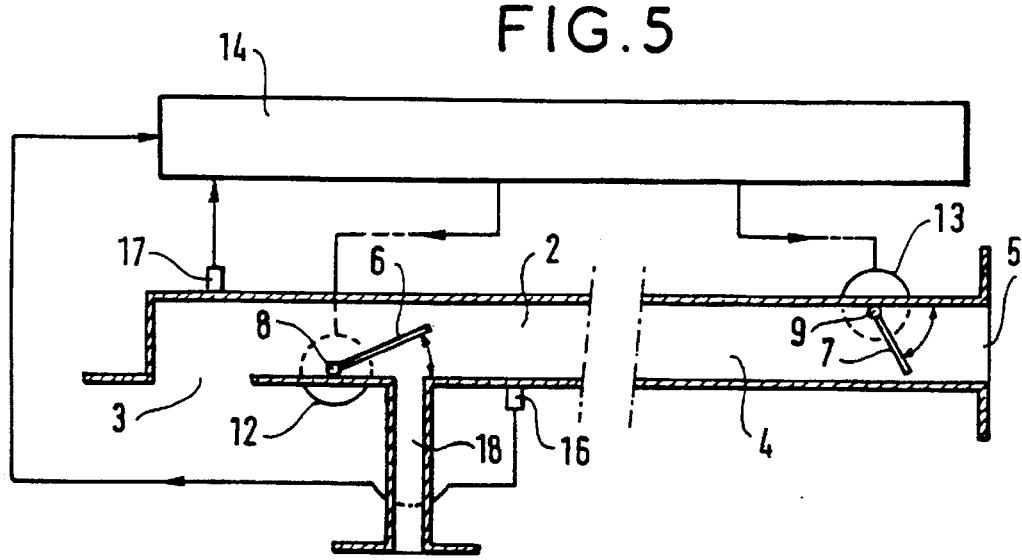

APPARATUS AND METHOD FOR PREVENTING SUDDEN CHANGES OF PRESSURE IN VEHICLES

The invention relates to apparatus and to a method for preventing sudden changes of pressure in vehicles, in particular in land vehicles.

The apparatus and the method of the invention for preventing sudden changes of pressure in vehicles is particularly applicable to high speed trains.

A vehicle moving through the atmosphere is subjected to pressure forces distributed over the outside wall of the vehicle in a manner that depends on the shape thereof and on its forward speed. When the vehicle passes close to an obstacle (tunnel mouth, bridge, various objects in the vicinity of a travel path, ...) or when going past an oncoming vehicle, the field of aerodynamic speeds entrained with the vehicle is deformed. This gives rise to rapid changes in pressure on the outside walls of the vehicle. This effect becomes more pronounced with increasing vehicle speed, since pressures are approximately proportional to the square of the speed.

In a vehicle where inside air is renewed from outside air by air conditioning or ventilation, inside pressure is close to outside pressure. Variations in outside pressure are transmitted almost instantaneously to the inside of the vehicle given the section sizes of the ventilation circuits. The time constant for transmitting pressure changes to the inside of air conditioned or ventilated vehicles is thus small, specifically because of the characteristics of the ventilation circuits. This rapid phenomenon does not occur when the inside of the vehicle is pressurized (e.g. airplanes).

For example, when high speed trains penetrate into tunnels or cuttings, rapid changes in pressure occur on the outside walls of the cars. These sudden changes propagate in the confined space constituted by the tunnel or the cutting and they are known as "pressure waves". In addition, these pressure waves propagate along the confined space outside the vehicle and reflect off the ends of the continued space, thus giving rise to return pressure waves that are just as large as the go waves. When the cars are well sealed, these changes are rapidly transmitted to the insides of the cars by the ventilation and air conditioning circuits, causing considerable discomfort to passengers. It is thus common to be subjected to pressure changes that may be as much as 2000 Pascals in less than one second.

To remedy this problem of pressure waves, certain high speed trains use "steep front" fans in the ventilation circuit. Those fans constitute, to some extent, an obstacle to pressure waves, but they have the drawback of being expensive and noisy. They constitute extra equipment of non-negligible weight and bulk even though great efforts are made to lighten cars as much as possible. They also consume large amounts of power. In addition, it is necessary to have two per car.

To mitigate those drawbacks, the present invention proposes constraining the inside pressure of an air conditioned or ventilated vehicle to vary at a rate that is fixed a priori whenever a sudden change in pressure occurs. To do this, appropriate apparatus operates in real time to create rapid changes to the geometrical characteristics of the ventilation or air conditioning circuits. These changes are such that the resulting change in the flow rate of air penetrating into the vehicle gives rise to a change in the pressure inside the vehicle that complies with the fixed rate. As soon as equilibrium is reestablished between inside and outside pressure, the ventilation circuit is put back into its configuration to enable normal fresh air renewal to proceed as before. Such a device placed on the ventilation circuits is equivalent to transforming a circuit designed for air renewal by ventilation or air conditioning very rapidly into a circuit that controls the inside pressure of the vehicle (and vice versa), whatever the sudden change in outside pressure (speed of the train, nature of the obstacle, outside topology, ...).

The invention thus provides apparatus for preventing sudden changes of pressure in an air conditioned or ventilated vehicle, the vehicle comprising:

an inlet orifice (3) for outside air and an outlet orifice (5) for inside air, the inlet orifice being connected to an intake duct (2) directing the air taken in to the air conditioning or ventilation system, the outlet orifice being connected to an exhaust duct (4) for exhausting inside air to the outside;

shutter means (6, 7) for the intake duct (2) and for the exhaust duct (4); and a control member (14) receiving the signals from the detector;

characterized by:

detector means (16, 17) for detecting the pressure outside Po and inside Pi the vehicle, and delivering signals representative of the pressure wave;

evaluation means for evaluating the amount of change in the outside pressure $\overline{\Delta Po}$ based on a first measurement corresponding to measuring the rate of change of outside pressure $dPo/dt$ and a second measurement corresponding to the measured difference Po–Pi between the outside pressure Po and the inside pressure Pi, said evaluation means indicating when the outside pressure change $\overline{\Delta Po}$ is greater than a first predetermined level $\overline{\Delta Po}_{Max}$ whenever at least one of the two measurements $dPo/dt$ and Po–Pi has a value lying outside a predetermined range of first limit values, respectively $\{(dPo/dt)_{Max}^{-}, (dPo/dt)_{Max}^{+}\}$, $\{(Po-Pi)_{Max}^{-}, (Po-Pi)_{Max}^{+}\}$ and the change in outside pressure $\overline{\Delta Po}$ is less than a second predetermined level $\overline{\Delta Po}_{Min}$ whenever the two measurements $dPo/dt$, Po–Pi give values lying between other predetermined limit values, respectively $\{(dPo/dt)_{Min}^{-}, (dPo/dt)_{Min}^{+}\}$ and $\{(Po-Pi)_{Min}^{-}, (Po-Pi)_{Min}^{+}\}$.

The means for detecting pressure changes are constituted by first and second pressure sensors.

Said other predetermined limit values $(dPo/dt)_{Min}^{+}$, $(Po-Pi)_{Min}^{+}$, and $(dPo/dt)_{Min}^{-}$, $(Po-Pi)_{Min}^{-}$ are equal to said first predetermined limit values $(dPo/dt)_{Max}^{+}$, $(Po-Pi)_{Max}^{+}$, and $(dPo/dt)_{Max}^{-}$, $(Po-Pi)_{Max}^{-}$.

Said predetermined limit values $(dPo/dt)_{Max}^{-}$, $(dPo/dt)_{Max}^{+}$, $(Po-Pi)_{Max}^{-}$, $(dPo/dt)_{Max}^{+}$, $(Po-Pi)_{Min}^{-}$, $(dPo/dt)_{Min}^{+}$, $(Po-Pi)_{Min}^{-}$, $(Po-Pi)_{Min}^{+}$ are equal in absolute magnitude but opposite in sign, such that the processing of the two measured values $dPo/dt$ and Po–Pi is performed on the absolute values thereof: $|dPo/dt|$, $|Po-Pi|$.

The apparatus can be modified to control the normal air conditioning flow rate by partial actuation of the shutter means for the intake duct and for the exhaust duct.

The invention also provides a method of preventing sudden changes of pressure in an air conditioned or ventilated vehicle, characterized by:

measuring the pressure inside the car;

measuring the pressure outside the car;

taking a first measurement of the rate of change of the outside pressure $dPo/dt$;

taking a second measurement of the difference Po–Pi between the outside pressure Po and the inside pressure Pi;

evaluating the level of outside pressure variation for which the outside pressure variation $\overline{\Delta Po}$ is greater than a first predetermined level $\overline{\Delta Po}_{Max}$ when at least one of the two measurements dPo/dt and Po–Pi gives a value not lying within a range of first predetermined limit values, respectively $\{(dPo/dt)_{Max}^{-}, (dPo/dt)_{Max}^{+}\}$, $\{(Po-Pi)_{Max}^{-}, (Po-Pi)_{Max}^{+}\}$ and the change in outside pressure $\overline{\Delta Po}$ is less than a second predetermined level $\overline{\Delta Po}_{Min}$ whenever the two measurements dPo/dt, Po–Pi give values lying between other predetermined limit values, respectively $\{(dPo/dt)_{Min}^{-}, (dPo/dt)_{Min}^{+}\}$ and $\{(Po-Pi)_{Min}^{-}, (Po-Pi)_{Min}^{+}\}$;

the intake and exhaust ducts (2, 4) are closed when said outside pressure change $\overline{\Delta Po}$ is greater than said first predetermined level $\overline{\Delta Po}_{Max}$;

bringing the inside pressure and the outside pressure into balance by allowing air to flow at a controlled rate between the outside and the inside of the vehicle in such a manner as to maintain the rate of change of pressure inside the vehicle below a set value; and opening the intake and exhaust ducts (2, 4) whenever the change in outside pressure $\overline{\Delta Po}$ is less than a second predetermined level $\overline{\Delta Po}_{Min}$.

The invention will be better understood and other details and features will appear on reading the following description given by way of non-limiting example and made with reference to the accompanying drawings, in which:

FIGS. 3 and 4 show the system for closing the air inlet and outlet ducts in apparatus of the invention; and FIG. 5 is a diagram of a variant of the apparatus of the invention.

FIG. 1 is a general diagram of a ventilation circuit for a car 1 of a high speed train.

Figure 1:
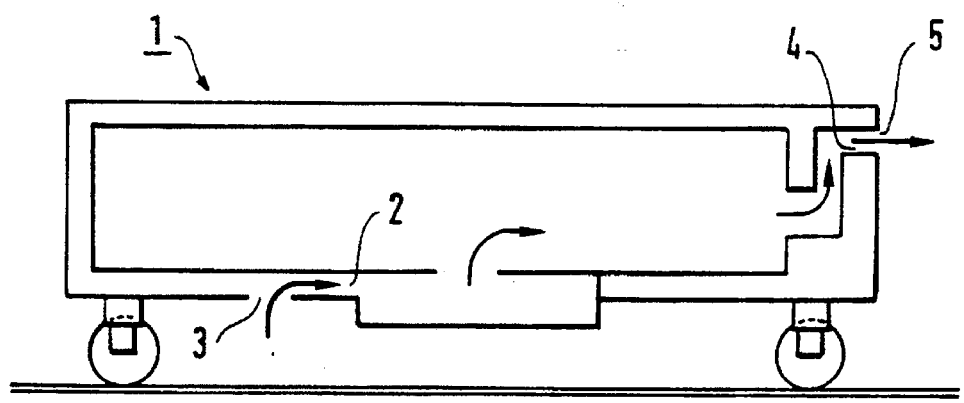
FIG. 1 is a diagram of a rail vehicle with its air inlet and outlet ducts for ventilating or air conditioning the vehicle.

The car has an intake duct 2 for outside air disposed between the inlet orifice 3 and the internal ventilation circuit, and it has an exhaust duct 4 for inside air disposed between the internal ventilation circuit and the air outlet orifice 5. The various elements of the internal ventilation circuit (partial recirculation of air, heater or air conditioner, fans, etc.) have no special influence on the operation of the apparatus of the invention.

When the car passes through a zone in which pressure changes suddenly, a relatively large volume of air (of the order of 1 m³ to 2 m³) suddenly enters or leaves the car via the ducts 2 and 4. This rapid change in the mass of air contained in the car is directly related to the change in pressure which, according to the invention, can be controlled by placing shutter elements in the ducts 2 and 4.

The apparatus of the invention performs the following operations. A pressure wave that occurs is detected by means of two pressure sensors which, after signal processing, make it possible to determine whether either the rate of change of the outside pressure or the difference between the inside and outside pressures exceeds a predetermined respective limit value.

As soon as a pressure wave has been detected, the shutter elements immediately close the ducts 2 and 4, completely or nearly completely.

This constrains the flow of air exchanged between the inside and the outside of the vehicle to take place over a length of time that is long enough for the changes of pressure inside the vehicle (pressure increase or decrease) to cause no discomfort to the passengers in the vehicle.

The shutter elements are opened again once the rate of change of outside pressure and the difference between the outside and inside pressures both lie within the predetermined limits. The ventilation system of the vehicle is put back into normal operation for exhausting vitiated air and replacing it with new air.

Figure 2:
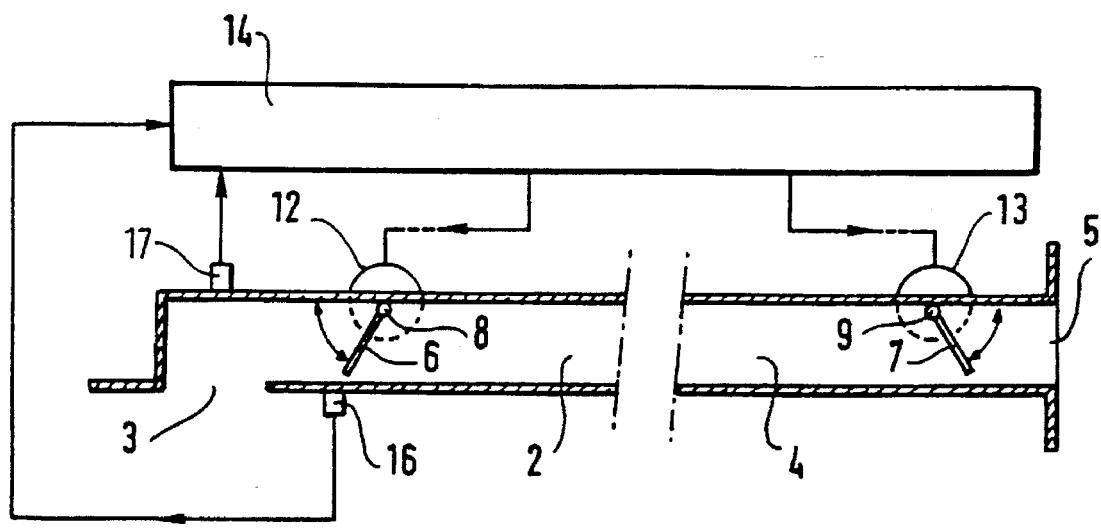
FIG. 2 is a diagram explaining how the apparatus of the invention operates.

FIG. 2 shows the operation of the apparatus in one particular embodiment. The shutter elements are flaps in this case: one flap 6 is disposed in the intake duct 2 and another flap 7 is disposed in the exhaust duct 4.

First and second pressure sensors 16 and 17 are disposed respectively inside and outside the vehicle.

The dimensions of the flaps 6 and 7 match those of the ducts 2 and 4. They are disposed in the vicinity of the inlet 3 and the outlet 5. They are rotatable on respective shafts 10 and 11 secured along one of the sides of each of them, and engaging hinge systems 8 and 9 associated with the walls of the ducts 2 and 4 (see FIGS. 3 and 4). The shafts 10 and 11 are rotated by respective actuators 12 and 13 secured to the structure 15 of the vehicle. The actuators may be pneumatic, hydraulic, or electromechanical.

An electronic system 14 for processing the signals delivered by the sensors 16 and 17 generates control signals for the actuators 12 and 13. The electronic system 14 may be of the type described in document FR 2 613 089. It may be integrated in the general control system of the train. As soon as the pressure wave detector(s) has/have detected a pressure wave that is judged to be excessive, the electronic system 14 immediately issues control signals to the actuators for closing the flaps. The flaps can be closed very quickly, e.g. in one-tenth of a second. They are preferably made of material that presents low inertia such as aluminum or a composite material.

The electronic system 14 is also suitable for switching off the air conditioning or ventilation devices at the same time as the flaps are closed. Said devices are switched back on again, still under the control of the electronic system, when the flaps are reopened.

As soon as the pressure wave detectors no longer detect pressure changes that are unacceptable for the passengers, the electronic system 14 causes the flaps to reopen progressively. The time it takes the flaps to reopen is a function of the desired level of comfort. It can be determined by experiment. It may also be determined by the electronic system as a function of certain parameters such as the amplitude of changes in outside pressure, the duration of the changes, etc. The ducts are thus reopened once the change in outside pressure has dropped below a level as determined by experiment or by computation. Given that the instantaneous air flow rate resulting from sudden changes in outside pressure is much greater than the usual ventilation flow rate, the flaps need not be in operation except in zones where pressure changes suddenly. In the absence of pressure waves, they may be fully retracted and thus avoid disturbing normal operation of the ventilation system.

The apparatus of the invention does not control the flow rate of ventilation or air conditioning air directly. Nevertheless, it can be used to control the normal air conditioning flow rate and to provide a plurality of air conditioning regimes, e.g. when the outside temperature is very high or very low. Various types of modification are possible.

The normal position of the flaps may be a part-open position so as to reduce the nominal ventilation flow rate.

The air flow rate can be controlled by continuously controlling the positions of the flaps, providing the performance of the actuators is capable of allowing the flaps to be controlled effectively in any position. The positioning of the flaps is then the result of regulation performed on the basis of measured ventilation flow rate, e.g. by using a flow meter.

The apparatus shown in FIG. 5 can also be used to bring inside and outside pressures into balance. In this variant, a branch connection 18 is provided on the intake duct 2. However this branch connection could be connected to any point of the ventilation circuit lying between the flaps 6 and 7. In the absence of pressure waves, the branch is normally closed.

The apparatus of FIG. 5 operates as follows. As soon as the detectors 16 and 17 detect the existence of a pressure wave, the ducts 2 and 4 are closed and the branch 18 is opened. Closure of one of the main ventilation circuits and opening of the branch may be performed by two independent mechanisms, or by a single mechanism as shown in FIG. 5 where the flap 6 serves simultaneously to close one of them while opening the other. The branch 18 controls the flow rate of air due to the pressure wave, in parallel with the leakage of the vehicle. The dimensions of the branch 18 may be defined in advance. The branch may also have a constriction of dimensions that are adjustable as a function of the required relationship for rate of pressure variation.

As soon as the pressures are taken to be in balance, the ducts 2 and 4 are opened and the branch 18 is closed. The ventilation system returns to normal operation.

The apparatus of the invention also has the advantage of consuming very little power.

We claim:

1. Apparatus for preventing sudden changes of pressure in an air conditioned or ventilated vehicle, the vehicle (1) comprising:

an inlet orifice (3) for outside air and an outlet orifice (5) for inside air, the inlet orifice being connected to an intake duct (2) directing the air taken in to the air conditioning or ventilation system, the outlet orifice being connected to an exhaust duct (4) for exhausting inside air to the outside; and shutter means (6, 7) for the intake duct (2) and for the exhaust duct (4);

characterized by:

detector means (16, 17) for detecting the pressure outside Po and inside Pi the vehicle, and delivering signals representative of the pressure wave;

a control member (14) receiving the signals from the detector means;

evaluation means for evaluating the amount of change in the outside pressure $\overline{\Delta Po}$ based on a first measurement corresponding to measuring the rate of change of outside pressure dPo/dt and a second measurement corresponding to the measured difference Po–Pi between the outside pressure Po and the inside pressure Pi, said evaluation means indicating when the outside pressure change $\overline{\Delta Po}$ is greater than a first predetermined level $\overline{\Delta Po}_{Max}$ whenever at least one of the two measurements dPo/dt and Po–Pi has a value lying outside a predetermined range of first limit values, respectively $\{(dPo/dt)_{Max}^-, (dPo/dt)_{Max}^+\}$, $\{(Po-Pi)_{Max}^-, (Po-Pi)_{Max}^+\}$ and the change in outside pressure $\overline{\Delta Po}$ is less than a second predetermined level $\overline{\Delta Po}_{Min}$ whenever the two measurements dPo/dt, Po–Pi give values lying between other predetermined limit values, respectively $\{(dPo/dt)_{Min}^-, (dPo/dt)_{Min}^+\}$ and $\{(Po-Pi)_{Min}^-, (Po-Pi)_{Min}^+\}$.

2. Apparatus according to claim 1, in which the means for detecting pressure changes (16, 17) are constituted by first and second pressure sensors.

3. Apparatus according to claim 1, in which said other predetermined limit values $(dPo/dt)_{Min}^+$, $(Po-Pi)_{Min}^+$, and $(dPo/dt)_{Min}^-$, $(Po-Pi)_{Min}^-$ are equal to said first predetermined limit values $(dPo/dt)_{Max}^+$, $(Po-Pi)_{Max}^+$, and $(dPo/dt)_{Max}^-$, $(Po-Pi)_{Max}^-$.

4. Apparatus according to claim 3, in which said predetermined limit values $(dPo/dt)_{Max}^-$, $(dPo/dt)_{Max}^+$, $(Po-Pi)_{Max}^-$, $(dPo/dt)_{Max}^+$, $(Po-Pi)_{Min}^-$, $(dPo/dt)_{Min}^+$, $(Po-Pi)_{Min}^-$, $(Po-Pi)_{Min}^+$ are equal in absolute magnitude but opposite in sign, such that the processing of the two measured values dPo/dt and Po–Pi is performed on the absolute values thereof: |dPo/dt|, |Po–Pi|.

5. Apparatus according to claim 1, modified to control the normal air conditioning flow rate by partial actuation of the shutter means for the intake duct (2) and for the exhaust duct (4).

6. A method of preventing sudden changes of pressure in an air conditioned or ventilated vehicle, characterized by:

measuring the pressure inside the car;

measuring the pressure outside the car;

taking a first measurement of the rate of change of the outside pressure dPo/dt;

taking a second measurement of the difference Po–Pi between the outside pressure Po and the inside pressure Pi;

evaluating the level of outside pressure variation for which the outside pressure variation $\overline{\Delta Po}$ is greater than a first predetermined level $\overline{\Delta Po}_{Max}$ when at least one of the two measurements dPo/dt and Po–Pi gives a value not lying within a range of first predetermined limit values, respectively $\{(dPo/dt)_{Max}^-, (dPo/dt)_{Max}^+\}$, $\{(Po-Pi)_{Max}^-, (Po-Pi)_{Max}^+\}$ and the change in outside pressure $\overline{\Delta Po}$ is less than a second predetermined level $\overline{\Delta Po}_{Min}$ whenever the two measurements dPo/dt, Po–Pi give values lying between other predetermined limit values, respectively $\{(dPo/dt)_{Min}^-, (dPo/dt)_{Min}^+\}$ and $\{(Po-Pi)_{Min}^-, (Po-Pi)_{Min}^+\}$;

the intake and exhaust ducts (2, 4) are closed when said outside pressure change $\overline{\Delta Po}$ is greater than said first predetermined level $\overline{\Delta Po}_{Max}$;

bringing the inside pressure and the outside pressure into balance by allowing air to flow at a controlled rate between the outside and the inside of the vehicle in such a manner as to maintain the rate of change of pressure inside the vehicle below a set value; and opening the intake and exhaust ducts (2, 4) whenever the change in outside pressure $\overline{\Delta Po}$ is less than a second predetermined level $\overline{\Delta Po}_{Min}$.

* * * * *